United States Patent [19]

DeMusis

[11] 4,028,788
[45] June 14, 1977

[54] METHOD OF REFURBISHING TURBINE BLADE AIR SEAL FLANGES

[76] Inventor: Ralph T. DeMusis, 547 Foxon Road, North Branford, Conn. 06471

[22] Filed: Jan. 12, 1976

[21] Appl. No.: 648,388

[52] U.S. Cl. .................. 29/156.8 B; 29/401 A; 416/213 R

[51] Int. Cl.² .................. B23P 15/02; B23P 7/00

[58] Field of Search ...... 29/156.8 B, 401 A, 401 E; 228/119; 416/213, 213 A; 415/216, 217; 51/140, 141, 135 R, 128, 82 R

[56] References Cited

UNITED STATES PATENTS

| | | | |
|---|---|---|---|
| 572,812 | 12/1896 | Longden | 51/140 |
| 908,977 | 1/1909 | Dickson | 51/140 |
| 1,178,400 | 4/1916 | Jones | 51/82 R |
| 1,282,022 | 10/1918 | Baker et al. | 51/98 R |
| 1,415,785 | 5/1922 | Brown | 51/141 |
| 2,030,704 | 2/1936 | Langford | 29/401 A |
| 2,334,960 | 11/1943 | Roth et al. | 51/141 |
| 2,562,229 | 7/1951 | Bell | 51/141 |
| 2,575,656 | 11/1951 | Coe, Jr. et al. | 51/141 |
| 2,934,864 | 5/1960 | Karbowski | 51/140 |
| 3,159,106 | 12/1964 | Schumbacker et al. | 29/156.8 CF |
| 3,564,689 | 2/1971 | Hirtenlechner | 416/213 |

FOREIGN PATENTS OR APPLICATIONS

| | | | |
|---|---|---|---|
| 140,341 | 2/1951 | Australia | 29/156.8 B |

*Primary Examiner*—C.W. Lanham
*Assistant Examiner*—Daniel C. Crane

*Attorney, Agent, or Firm*—H. Gibner Lehmann; K. Gibner Lehmann

[57] ABSTRACT

A method of refurbishing the air seal flanges of turbine blades which have become worn, comprising the steps of adding a bead of welding material to the opposite side portions and the edge portions of the flange so as to build up those areas which have been worn away, and thereafter removing controlled amounts of the built up areas so as to restore the piece to its original geometry. In the latter step, the blade is clamped in a first machine having a pair of abrasive belts and a pair of pivotally mounted pressure shoes engageable with the backs of the belts respectively, such that their abrasive surfaces can be brought into engagement with the opposite sides of the air seal flanges. Controlled quantities of the built-up flange can be removed, depending on the degree of advancement of the shoes. In another machine, the blade is placed on a slide which approaches an abrasive belt backed by a special curved contour shoe, whereby as the edge of the seal engages the abrasive surface of the belt, the latter yields an extent, conforming to the particular contour of the shoe. This has the effect of imparting a predetermined, desired profile to the flange. Following the welding and refinishing operations, the geometry and physical characteristics of the refurbished blade closely resemble those of a new blade. By the above method, considerably less expense is entailed over that involved with discarding the old blades and fabricating new ones.

2 Claims, 11 Drawing Figures

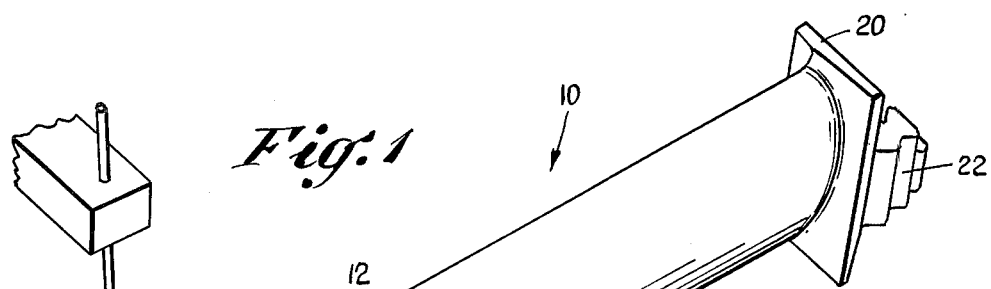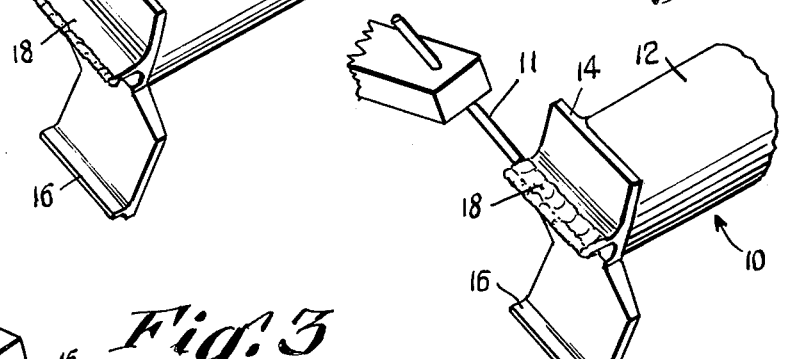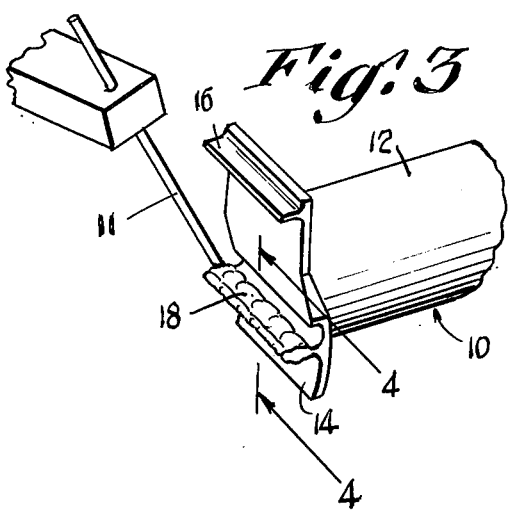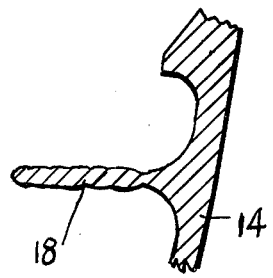

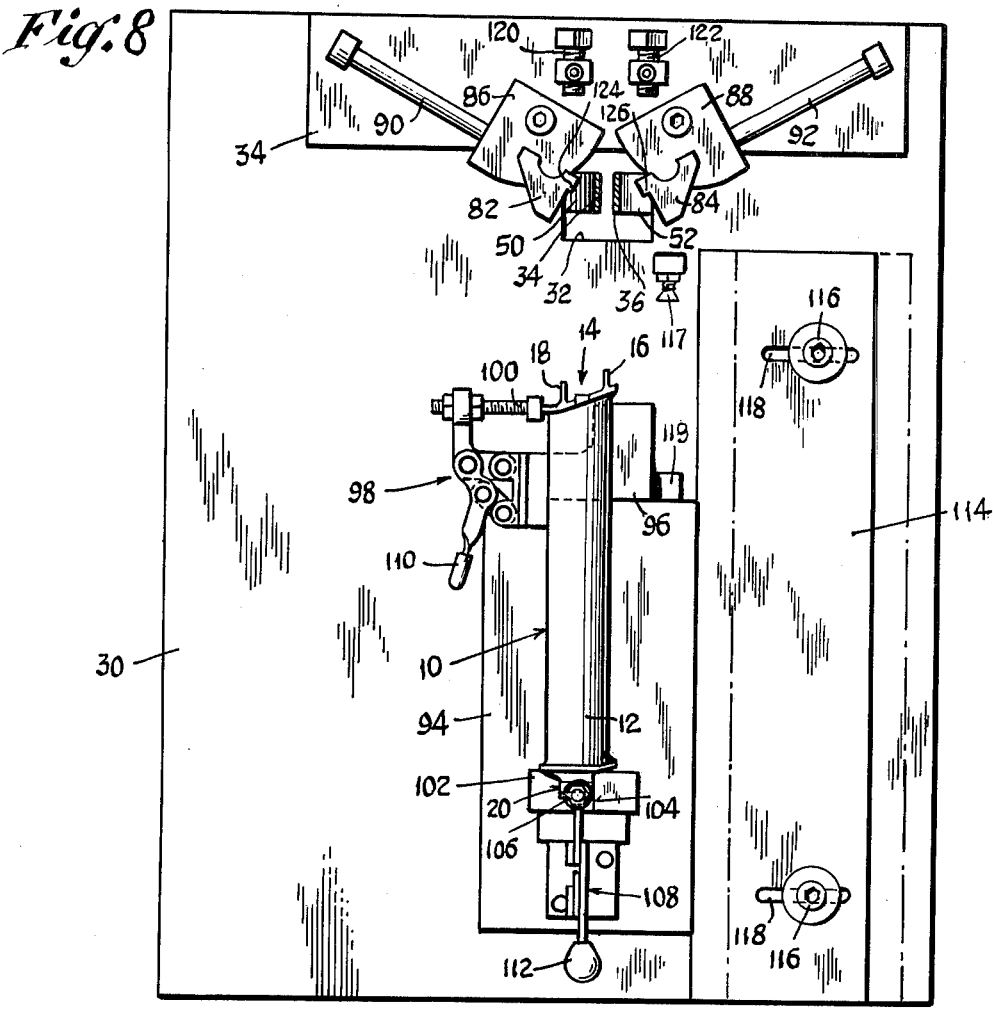

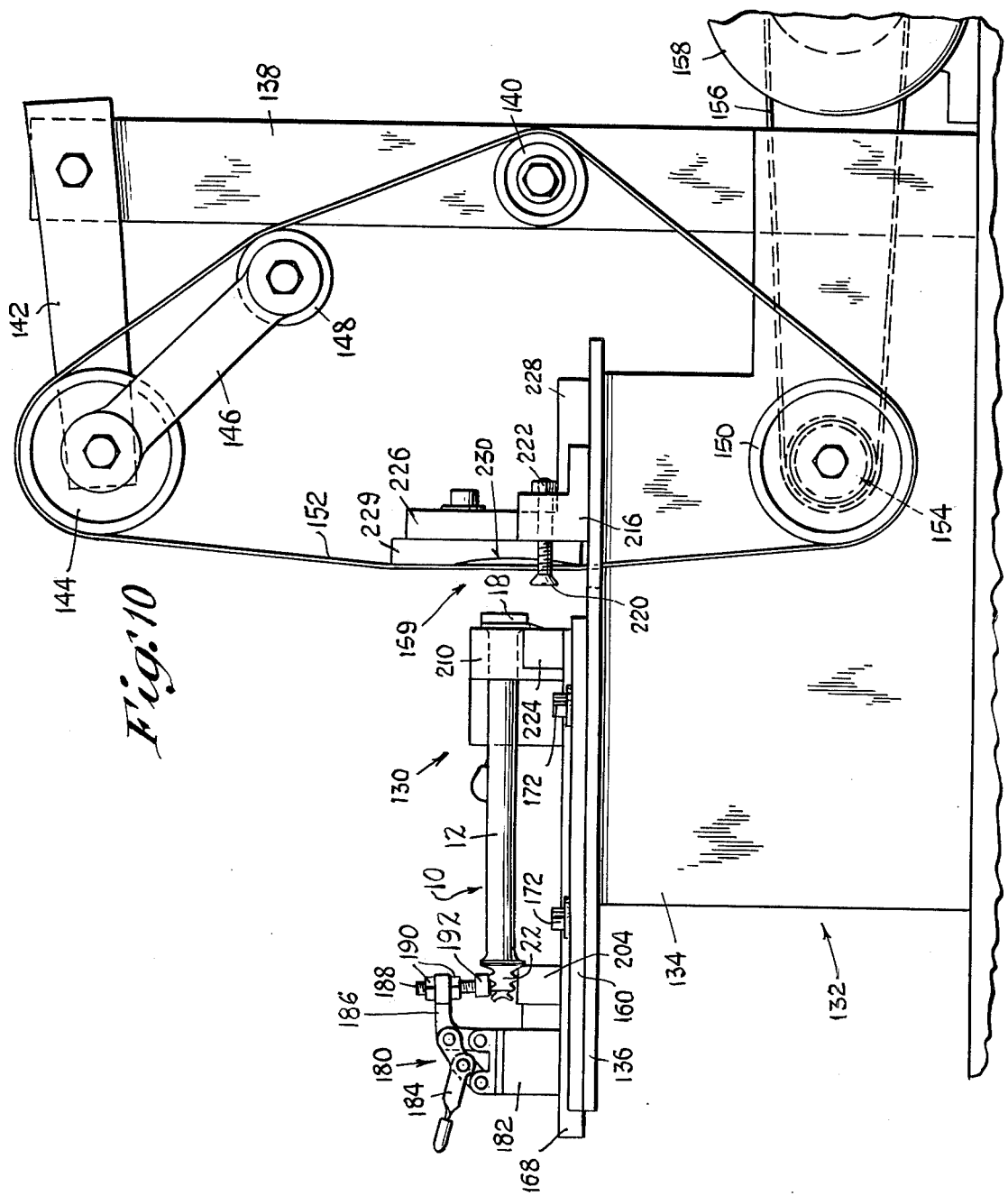

METHOD OF REFURBISHING TURBINE BLADE AIR SEAL FLANGES

CROSS REFERENCES TO RELATED APPLICATIONS

1. My co-pending application, U.S. Pat. No. 574,563 filed May 5, 1975, now Pat. No. 3,984,212, and entitled TURBINE BLADE AIR SEAL, SIDE GRINDER.

1. My co-pending application, U.S. Pat. No. 574,564 filed May 5, 1975, now Pat. No. 3,969,848, and entitled TURBINE BLADE AIR SEAL EDGE GRINDER.

BACKGROUND

This invention relates to methods for refurbishing critical surfaces of air seal flanges of turbine blades which have become worn and otherwise no longer useful.

Generally, turbine blades are constituted of high-temperature, high-strength alloy especially adapted to withstand the temperatures and stresses imposed on the parts of a turbine assembly. In the past, repair of such turbine blades has been sufficiently complex and expensive as to make it impractical to undertake such operations on a large scale. Instead, when the blades have become worn they were discarded, with new blades substituted in their place. Due to the fact that such blades are cast of special metal alloy and involve complex molds and time-consuming finishing operations, they tended to be very expensive. Accordingly, replacement of entire units has not been practical.

Part of the problem with resurfacing blades was that the tolerances involved tended to be rather critical. In addition, it was extremely difficult to duplicate, by hand, the original surfaces on a worn piece.

SUMMARY

The above disadvantages and drawbacks of prior procedures are obviated by the present invention, which provides a novel method for refurbishing the air seal flanges of turbine blades which have become worn, the method being both simple, and economical from the standpoint of salvaging existing parts for further use. Another object is the provision of a method whereby the dimensions of the refurbished blades can be closely controlled, to yield a refurbished blade having a geometry and having physical characteristics closely resembling those of a new blade. According to the present invention, blades having worn air seal flanges can be effectively repaired whereby their useful life is greatly extended, thus resulting in a considerable saving of money and time.

The above objects are accomplished by the provision of a method for refurbishing or repairing the air seals of worn turbine blades, comprising the steps of adding a bead of welding material to the sides and to the edge of the flange to be resurfaced, and then grinding off part of the built up region in order to restore the air seal to its original geometry. The welding rod preferably has a chemical composition substantially the same as that of the turbine blades being refurbished. In accomplishing the grinding, two machines are involved. One machine comprises a bench or table constituting a work performing station, at which one or several pressure shoes are pivotally mounted. One or several cutting belts having surfaces provided with cutting particles are mounted on pulleys so that the cutting surfaces pass (in the case of two belts) between two pressure shoes, in face-to-face, spaced relation to each other with the backs of the belts facing the shoes. The shoes are provided with handles by which they can be pivotally actuated to advance them against the backs of the belts so as to make the cutting surfaces of the belts approach each other. On the top of the bench a slide is provided, having clamping means adapted to accommodate a turbine blade in such a manner that the air seal flange thereof can be interposed between the spaced apart cutting belts at the work-performing station. Thereafter, when the pressure shoes are actuated to force the cutting surfaces of the belts against the opposite sides of the air seal flange, the excess metal is removed therefrom. Adjustable stop means are provided on the bench top, engageable with the pressure shoes to limit the pivoting movement thereof to that required for removing only the desired amount of excess metal. A guide adjustably secured to the bench top facilitates the correct positioning of the turbine blade so that the seal flange thereof can be readily interposed between the cutting surfaces of the belts.

Accordingly, the method of the invention involves clamping a turbine blade onto the slide, following the welding operation outlined above, advancing the slide toward the work-performing station such that the air seal flange to be resurfaced is positioned adjacent to the belts, and advancing one or both pressure shoes by limited amounts into engagement with the backs of the belts respectively to bring their abrasive surfaces into engagement with the opposite sides respectively of the air seal flanges so as to remove a portion of the welded material and thereby restore the sides to their original geometry.

In the second machine, a circulating abrasive belt is carried by a machine base, including means for driving the belt. A contoured backing shoe is affixed to the base at a work-performing thereon, and a slide is movable over the base toward and away from the shoe at the station. Means are provided for releasably clamping a turbine blade to the slide with the edges of the seal flanges disposed toward the work-performing station. Additionally, adjustable stop means are provided on the base for limiting the advancing movements of the slide toward the belt.

Accordingly, the method of the invention involves clamping onto the slide a turbine blade which has just been refinished by the first machine, and advancing the blade into engagement with the abrasive belt at the areas thereof which are backed up by the contoured shoe, such that the belt yields an extent, according to the contour of the shoe. By such an arrangement predetermined portions of the edge of the seal flange are removed, providing to the flange a profile closely resembling that of the shoe. With the present method, an operator can quickly and accurately impart a particular surface configuration to the edge of the seal flange. In addition, the repeatability of the contour between successive blades is extremely good. As a result, overall error due to judgment by the operator is greatly minimized.

Following welding, the order of refinishing in the two machines is not critical, and accordingly may be reversed from that procedure described above.

Other features and advantages will hereinafter appear.

In the accompanying drawings:

FIG. 1 is a perspective view of a turbine blade, particularly showing a welding rod, and illustrating the application of welding material to the edge of one of the air seal flanges of the blade.

FIG. 2 is a view like FIG. 1, showing the application of welding material to one side of one of the air seal flanges of the blade.

FIG. 3 is a different perspective view of the turbine blade of FIG. 1, showing the application of welding material to the opposite side of the one air seal flange which was welded in FIGS. 1 and 2.

FIG. 4 is a section taken on line 4—4 of FIG. 3.

FIG. 5 is an elevational view of a refurbished turbine blade of the type shown in FIGS. 1-3. The elevation shown is of the outer end of the blade.

FIG. 6 is an elevational view of the inner end of the turbine blade of FIGS. 1-3.

Figure 7:
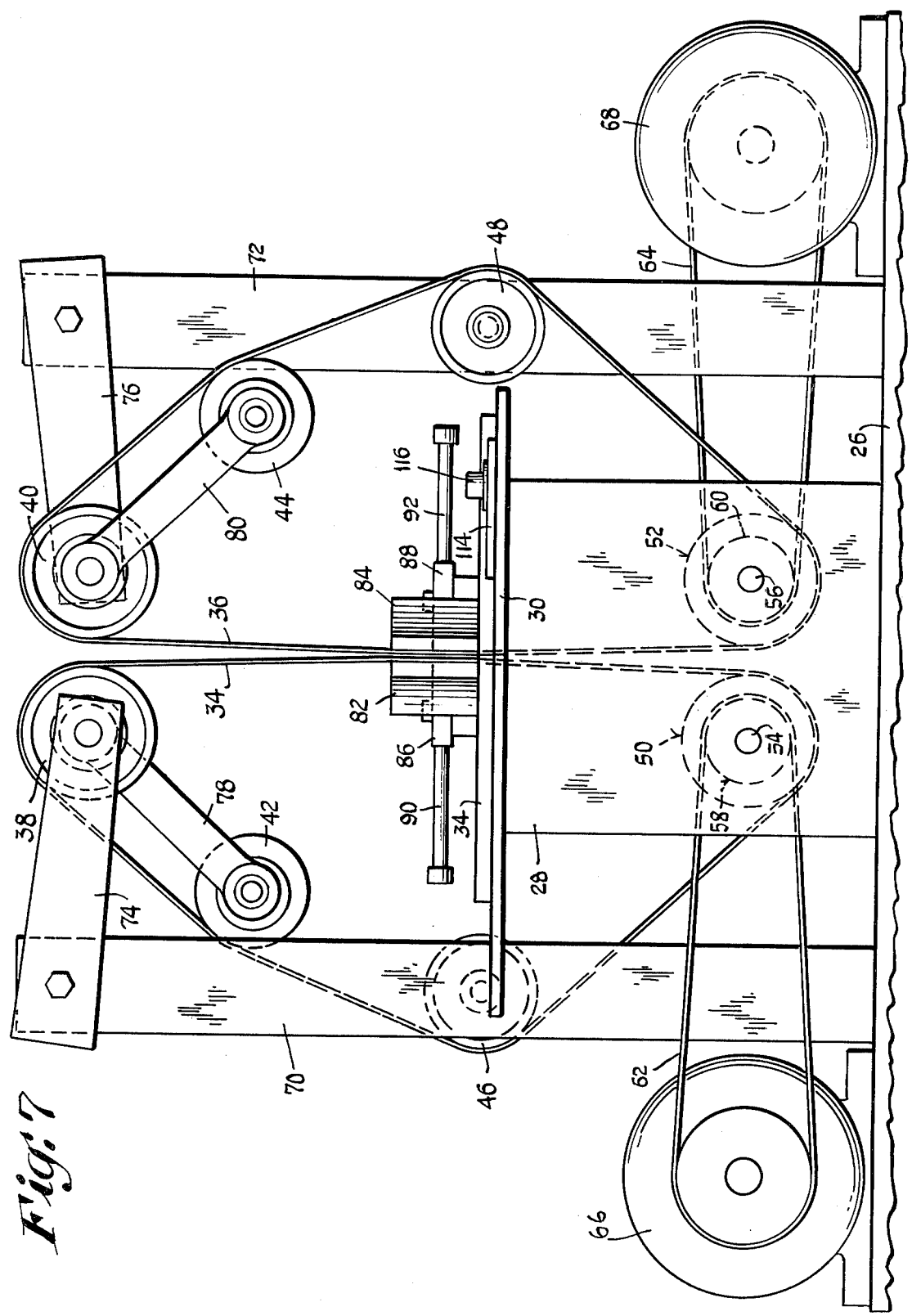
FIG. 7 is a front elevational view of one grinder machine employed in carrying out the method as provided by the present invention.

FIG. 8. is a top plan view of the bench top and associated components of the machine of FIG. 7. The various parts are shown in the normally inoperative or non-finishing position.

FIG. 9 is a fragmentary top plan view revealing the parts of the machine in their operative positions, refinishing the opposite side surfaces of an air seal flange which has been built up by welding.

FIG. 10 is a side elevational view of a second grinder machine employed in carrying out the method of the present invention, showing a blade clamped in position on a slide and having one seal flange positioned for movement into engagement with the abrasive belt.

Figure 11:
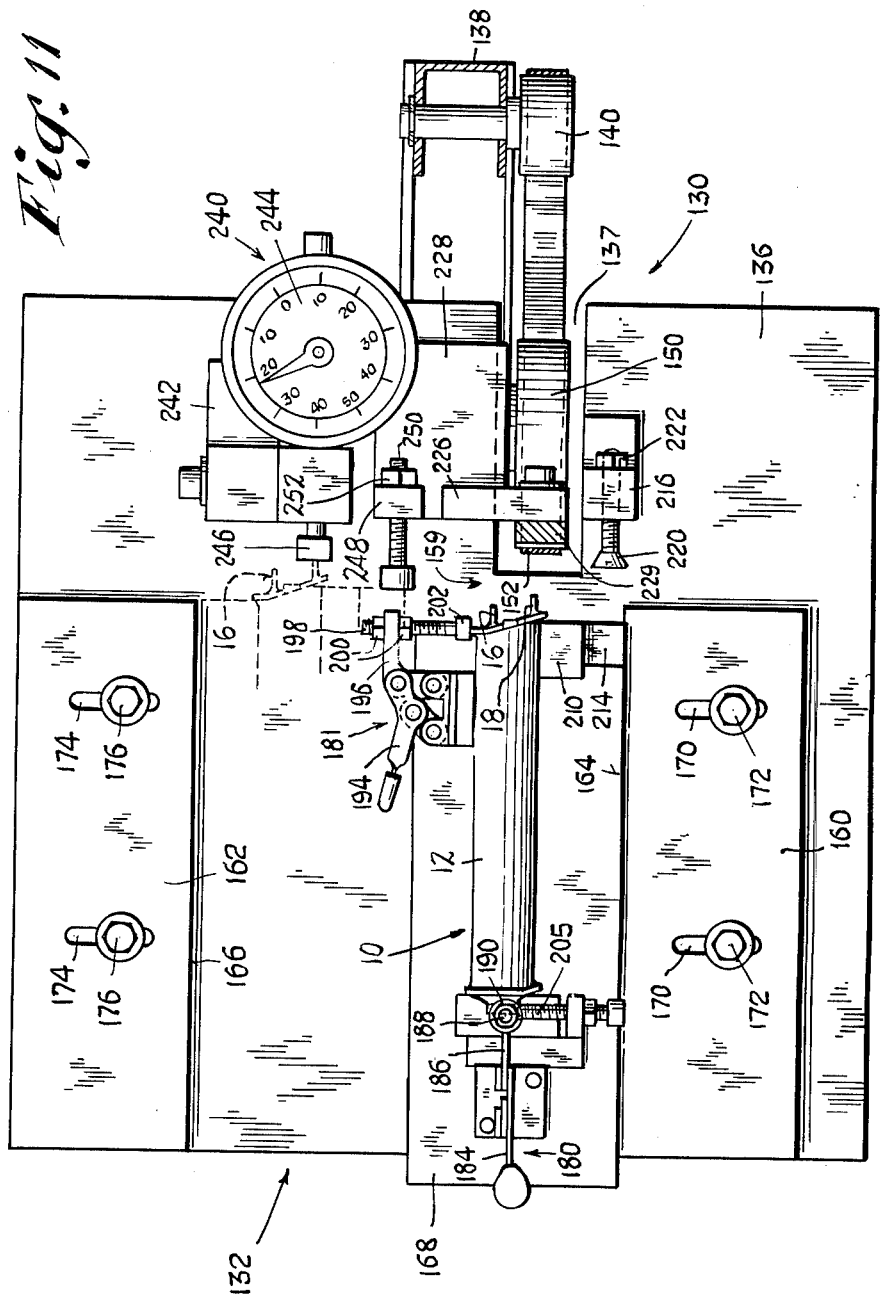

FIG. 11 is a top plan view of the machine of FIG. 10.

FIGS. 1-3, 5 and 6 show a typical turbine blade generally designated by the numeral 10 and including a curved elongate blade body 12 having at its outer end 14 an interlocking configuration of usual design, provided with air seal flanges 16, 18. At its other or inner end 20, the turbine blade 10 has a usual type of mounting base configuration 22 by which it is secured to the rotor of the turbine.

During the use and operation of the turbine engine, the air seal flanges 16, 18 become worn and lose their effectiveness. In the past, turbine blades having worn air seal flanges were discarded, and this was a wasteful practice inasmuch as the cost of fabrication of such blades was extremely high. Turbine blades of this type are fabricated of special metallic alloys formulated to withstand greatly elevated temperatures while at the same time maintaining their mechanical strength.

In accordance with the present invention it is no longer necessary to discard such turbine blades when the air seal flanges become worn. Instead, the invention proposes resurfacing or replenishing the sealing flanges, as by adding metal through an electric welding process. In this fashion the worn portions of the air seals can be replaced by metal of suitable alloy, having the necessary strength and resistance to high temperatures. After the addition of the metal by welding, the seal flanges are irregular and oversize, and require refinishing.

The present invention accordingly provides a novel and unique method which can quickly and accurately refinish the side surfaces and the edge of the built-up air seal flanges, the refinishing of the side portions being accomplished in one machine, particularly shown in FIGS. 7-9, and the refinishing of the edge portions being accomplished in a second machine, shown in FIGS. 10 and 11. In accomplishing the method, small quantities or beads of welding material are applied to the worn areas on the opposite sides and on the edge of either seal flange 16 (or seal flange 18), as by a welding rod 11 connected to suitable electric welding equipment (not shown). FIG. 1 shows the welding material being applied to the edge of the air seal flange 18, while FIGS. 2 and 3 show the material being applied to the opposite sides of this flange. The flange 16 can be welded in an analogous manner, following completion of the welding on the flange 18. Typically the rod diameter is on the order of 1/32 inch, and the composition of the welding rod is substantially the same as that of the material of which the blade is constituted. It is known as Haynes alloy 25, or 31 and the chemical analysis of the compound is as follows:

Parts by weight:
1. Carbon: 0.09
2. Silicon: 0.22
3. Manganese: 1.55
4. Phosphorus: 0.018
5. Sulfur: 1.007
6. Chromium: 20.32
7. Nickel: 10.56
8. Tungsten: 14.30
9. Iron: 2.25
10. Cobalt: 50.685

Such rod or wire is supplied commercially and is known as type L-605. FIG. 4 shows a cross section of the air seal flange after the welding has been completed. It is noted that the new dimensions of the flange exceed those of the flange of a new unit in order to enable the excess to be precision ground, as will be described below.

In accomplishing the grinding operation by the first machine, and referring to FIGS 7-9, the turbine blade 10 is secured in position as shown. The machine comprises a bench or table 26 formed of upstanding heavy metal plates 28 to which is secured a horizontal top plate 30. As seen in FIG. 8, the top plate 30 has a slot or well 32 at its rear, which is partially bridged by a bridge plate 34 secured in any suitable manner.

Passing through the remainder or open part of the well 32 are left and right cutting belts 34, 36 respectively constituted of any suitable construction such as fabric having cemented to one side surface emery or carborundum grits or the like. The belts 34, 36 respectively pass over left and right top pulleys 38, 40, left and right bottom drive pulleys 50, 52. Between the widely spaced top pulleys 38, 40 and bottom pulleys 50, 52, the belts 34, 36 have a considerable expanse or length, and pass upward through the top plate 30 in the well 32 thereof. At the well or work-performing station 32 the belts are capable of being readily shifted laterally.

The left and right bottom pulleys 50, 52 are respectively carried on shafts 54, 56 which mount smaller-diameter drive pulleys 58, 60 engaged and driven by left and right belts 62, 64 from left and right drive motors 66, 68.

Secured to the bench 26 are left and right uprights 70, 72 constituted of channel members, said uprights mounting the idler pulleys 46, 48 and also at their upper extremities carrying left and right over-arms 74, 76 respectively, on which are mounted the top pulleys 38, 40. The over-arms 74, 76 also support spring biased tension arms 78, 80 at the extremities of which the left and right idler pulleys 42, 44 are carried. It will be understood that the tension arms 78, 80 and the idler pulleys 42, 44 maintain the required tension in the cutting belts 34, 36.

Referring now to FIG. 8, the bridge plate 34 carries left and right pressure shoes 82, 84, these being secured to carrier blocks 86, 88 which are pivotally mounted on the bridge plate. Actuator handles 90, 92 secured to the carrier blocks 86, 88 enable the machine operator to swivel the blocks and also the pressure shoes 82, 84 carried thereby, in a manner to apply pressure to the backs or non-cutting surfaces of the belts 34, 36. As seen in FIG. 8, the pressure shoes 82, 84 are spaced from the belts and the handles 90, 92 are retracted or shifted rearward with respect to the bridge plate 34. The cutting belts 34, 36 in passing through the well 32, extend between the pressure shoes 82, 84, as clearly shown. For such condition, the cutting belts will have their cutting surfaces spaced apart a distance sufficient to readily admit one of the seal flanges 16, 18 of the turbine blade 10. However, when the handles 90, 92 are pulled forwardly by the operator of the machine, the pressure shoes 82, 84 will be swiveled toward each other and will engage the back, non-cutting surfaces of the belts 34, 36 in a manner to cause the cutting surfaces thereof to approach each other, all as shown in FIG. 9.

As provided by the invention, the turbine blades 10 can be mounted one at a time on a slide 94 which carries a clamp block 96 adapted to engage and position a side portion of the turbine blade 10 adjacent the outer end 14 thereof. The slide 94 also carries a toggle clamp 98 having a jaw portion 100 adapted to engage the other side portion of the turbine blade so as to enable the blade to be securely, fixedly clamped to the slide. The inner end 20 of the turbine blade rests on a second clamp block 102 and is positioned against a shoulder 104 thereof. The mounting base portion 22 of the blade 10 is engaged by the clamping jaw 106 of a toggle clamp 108 which is mounted on the slide 94.

The toggle clamps 98, 108 have handles 110, 112 respectively, by which the jaws are actuated to their clamping positions and locked therein. The action of the toggle clamps 98, 108 is well understood, and needs no further explanation since per se they form no part of the present invention.

A guide plate 114 is secured to the top surface of the bench plate 30 by clamp screws 116 passing through slots 118 whereby the guide plate can be adjustably fixed in different positions. Cooperable adjustable stops 117 and 119 respectively on the top plate 30 and slide 94 limit the advancing or upward (as viewed in FIG. 8) movement of the slide 94 to that just necessary to bring the seal 16 (or 18) between the belts 34, 36. With the arrangement illustrated in FIG. 8, the slide 94 can be shifted upward as viewed in the figure along the guide plate 114 so as to bring the seal flange 16 (or 18) between the cutting surfaces of the cutting belts 34, 36 in the manner shown in FIG. 9. After this has been done, the operator grasps the handles 90, 92 and pulls them forwardly so as to bring together the pressure shoes 82, 84 against the back surfaces of the belts 34, 36 and shift the belts forcibly into engagement with the opposite side surfaces of the seal flange 16 (or 18). The cutting belts thereupon remove the excess welding material from the opposite sides of the seal flange, and effectively refinish the flange to have the characteristics needed for operation, including the required original smooth surface. In order to predetermine the exact amount of material which is removed from the seal flange during the finishing operation, left and right adjustable stop screws 120, 122 are provided on the bridge plate 34, such screws being engageable with the carrier blocks 86, 88 as shown in FIG. 8 to limit the pivoting movement thereof.

After a short interval of time, during which the cutting belts 34, 36 are removing material, the operator releases his pressure against the handles 90, 92 and shifts them rearward to the position illustrated in FIG. 8. An inspection of the refinished flange 16 will reveal whether additional material need be removed, or else if the flange is in a satisfactory, finished state. The pressure shoes 82, 84 are provided with shouldered positioning portions 124, 126 which are adapted to engage the back edge surfaces of the cutting belts 34, 36 and maintain the alignment of such belts at the time that they are removing metal.

The additional refinishing operation, involving the edge of the air seal flange 16 (or 18) is accomplished in a second machine 130 shown in FIGS. 10 and 11.

The machine includes a bench or base 132 having side plates 134 and a top plate 136. The latter is provided wth a slot or well 137 which extends to a work-performing station identified below. Carried by one of the side plates 134 is an upright support member constituted as a channel 138, having a pulley 140 and an over-arm 142, the latter carrying an additional pulley 144. Also carried by the over-arm 142 is a tension arm 146 having a take-up idler pulley 148. In addition, a drive pulley 150 is carried by the base 132, and an abrasive belt 152 is installed around the pulleys 140, 144, 148 and 150, the outer surface of the belt 152 having cutting grits or other abrasive material adhered thereto. Attached to the shaft is a pulley 154, and a drive belt 156 extends therefrom to a drive motor 158. The arrangement is such that the cutting belt 152 is maintained in tension by the idler pulley 148, with drive power to the belt being provided by the motor 158. The above-described pulleys contituted a means for driving the belt 152 through a well in the base 132 and past a work-performing station as explained below.

Means carried by the base 132 are provided, for advancing a turbine blade 10 on a work-performing station indicated generally by the numeral 159, and for removing controlled amounts of end portions of the turbine blade air seal 16 (or 18) by means of an abrading operation utilizing the belt 152. Referring to FIG. 11, the top plate 136 of the bench or base 132 carries a pair of guide plates 160, 162 which have longitudinal edges 164, 166 facing one another, adapted to selectively engage the opposite longitudinal edges of a slide 168. As shown, the lower guide plate 160 has a pair of slots 170, and draft screws 172 extend through the slots 170 and into the top plate 136 in order to enable adjustment of the position of the plate 160 with respect to the work-performing station 159. Similarly, the other guide plate 162 has slots 174 receiving screws 176, to enable adjustment in the position with respect to a gauge or indicator described below.

Referring again to FIG. 11, it can be seen that the slide 168 carries a pair of toggle clamps 180, 181 which can be substantially identical with respect to one another. The clamp 180 is mounted on a support block 182 which in turn is secured to the slide 168. The clamp 180 is of the type which includes an actuator arm 184 and a pivot arm 186, the latter carrying a clamp jaw in the form of a screw 188 locked to the arm 186 by a pair of nuts 190. Disposed at the end of the jaw is a rubber abutment face 192 which is adapted to engage the mounting base portion of the turbine blade 10 to be resurfaced, as will be explained below. Similarly, the clamp 181 includes an actuator arm 194 and a pivot arm 196, the latter carrying a clamp jaw in the form of a screw 198 secured by means of locking nuts 200. Carried at the end of the clamp jaw 198 is a rubber abutment face 202.

Referring again to FIGS. 10 and 11, there is provided on the slide 168 a clamp block 204 and 205 adapted to support one end of the turbine blade, together with the rubber abutment face 192. Similarly in FIG. 11, there is provided an additional clamp block 210 which is adapted to engage a longitudinal edge portion of the turbine blade 10, so as to provide a back up for the clamp jaw abutment face 202.

Adjustable stop means are provided, carried on the slide 168 and on the plate 136 for limiting the advancing movement of the slide (and turbine blade) toward the belt 152. This means comprises a stop or abutment 214 on the slide, and a mounting or block 216 carried on the top plate 136 of the base. As shown in FIGS. 1 and 2, the block 216 carries a stop member in the form of a screw 220 together with a locking nut 222 for securing the screw in predetermined fixed positions. The head of the screw is adapted to be engaged by the stop or abutment 214 as the slide 168 is moved toward the right in FIGS. 10 and 11.

There is carried by the top plate 136 an upstanding support post 226 which has a base 228 secured by suitable screws (not shown). The post 226 in turn mounts a contoured member or back-up shoe 229 having a concave or contour surface 230 shown as having a slight curvature or large radius.

Referring to FIGS. 10 and 11, in operation, the turbine blade 10 is shown as being clamped in place with its concave side facing downward when viewed in FIG. 10. The clamping is accomplished by actuation of the toggle actuator arm 184 which brings the abutment face 192 into firm engagement with the mounting base 22 of the blade, together with actuation of the toggle arm 194 to bring the rubber abutment piece 202 into engagement with the upper edge of the turbine blade as viewed in FIG. 11. The clamp block 210 thus constitutes a stationary jaw cooperable with the jaw formed by the screw 198 and rubber abutment face 202. Considering the slide 168 in the position illustrated in FIG. 10, and with the belt 152 driven by the motor 158 it will be seen that as the slide is advanced toward the right, the end surfaces of the seal flange 16 (or 18) will be brought into engagement with the belt. As this is done, the belt, being somewhat yieldable, will be urged inwardly so as to partially occupy the contour surface 230 of the back-up shoe 229. As a result, the grinding of the end of the flange 16 (or 18) which occurs is not along a straight line. Instead, it tends to assume a curved shape which is governed by the particular configuration of the contoured surface 230. As the slide is progressively moved or advanced toward the right, the stop or abutment 214 will be engaged by the head 220 of the adjustable stop screw. This will effectively limit the rightward movement of the slide to a predetermined amount, thus limiting the amount of grinding of the seal flange 16 (or 18) which occurs.

Preferably, during the grinding or abrading process, it is desirable to check the dimension of the flange 16 (or 18) in order to insure that only the proper predetermined amount of material is taken off. Means are provided for accomplishing this, including an indicator device 240 which is secured to the upper top plate 136 by means of an indicator mount 242. The indicator 240 includes a gauge 244 having a feeler arm 246 adapted to be engaged by the air seal flange 16 (or 18) when the slide 168 is positioned to engage the guide plate 162 and then advanced. Such a position is illustrated in broken lines in FIG. 11, wherein one flange is shown engaging the feeler 246. In addition, adjustable stop structures are provided for limiting the movement of the slide during its engagement with the guide plate 162, the stop structures comprising a stop consisting of a screw mounting block 248 carrying an adjustable screw 250 which is secured by means of a locknut 252. The head of the stop or screw 250 is adapted to be engaged by the stop or abutment 214 on the slide 168 as the latter is moved toward the right in FIG. 11. During such engagement the feeler 246 will yield a certain amount, according to the dimensions of the flange 16 (or 18), and these dimensions will be indicated by the reading on the gauge 244.

During the refinishing process, assuming that too little material has been removed as indicated by the indicator reading, the slide 168 can be returned to its position of engagement with the guide plate 160 and an additional check can be made to insure that the stops 214, 220 are firmly engaged. Following such additional procedure the slide 168 can be easily again shifted to the gauging position, engaging the upper guide plate 162 in order to again check the dimensions of the flange 16 (or 18). The process can be repeated, of course, until the proper reading is obtained on the indicator 244.

It will be seen that due to the unique mounting arrangement of the turbine blade on the slide 168, removal of the blade is not required each time it is desired to check the dimensions of the flange 16 (or 18) or check for belt wear. Instead, the slide 168 is merely moved from engagement with the guide plate 160 to the other guide plate 162. As a result, greatly simplified operation is achieved, with a minimum of wasted time. In addition, slight misalignment of the turbine blade with respect to the slide 168 which might possibly occur if the blade had to be removed and reclamped, is eliminated. The setting-up of the machine is greatly facilitated by means of the adjustable stop screws 220, 250, utilizing for example, a master or new blade against the indicator feeler 246. Once a blade having the proper characteristics is obtained by means of the above grinding process, a resurfacing of subsequent blades is greatly simplified, involving only the removal of the properly resurfaced blade and the installation of the next unfinished blade.

By virtue of the provision of the slots 170, 174 in the guide plates 160, 162 respectively, adjustment of the plate positions can be readily obtained. This also enables the subsequent grinding of the second air seal flange 18. Such operation is accomplished by merely loosening the screws 172, 176 and sliding the guide plates 160, 162 downward as viewed in FIG. 11, so that the flange 18 will be in alignment with the center of the belt 152. Thereafter the screws are retightened. In addition, slight re-adjustment of the stop screws 220 and 250 will have to be made, in order to effect refinishing of the second flange 18, as is understood.

From the above it can be seen that I have provided a novel and improved turbine blade resurfacing method which is extremely simple, and which provides a satisfactory solution to the problem of mass restoring of large numbers of substantially identical turbine blades. The method eliminates errors due to operator judgment, and as a result it greatly improves the uniformity and quality of restored blades. The invention thus represents a distinct advance and improvement in the technology of reclaiming of worn turbine blades.

Variations and modifications are possible without departing from the spirit of the invention.

I claim:

1. The method of refurbishing the elongate air seal flanges of worn turbine blades, which includes the steps of:

a. adding a bead of welding material to worn areas of the air seal flange of a blade so as to build up portions thereof which have been worn away, and thereafter in a machine having a work-performing station, a power driven abrasive belt adjacent the station and a contoured back-up shoe having a planar front surface containing an elongate recess characterized by a curved surface with a profile resembling that of the original geometry of the air seal flange of a turbine blade but of greater length than said flange whereby portions of the belt occupying said recess can have a length in excess of the length of the air seal flange, said shoe being engageable with the back of the belt such that the latter can yield and conform to the profile when its abrasive surface is engaged by a workpiece, and having a slide advanceable toward the work-performing station, the steps of:

b. clamping the blade onto said slide, with its air seal flange facing said work-performing station and extending substantially parallel to that portion of the belt at said station, and c. advancing the slide and blade a sufficient distance toward the work-performing station to cause the edge of the air seal flange to engage the abrasive surface of said belt and force the latter to yield an extent and conform to the particular curved profile of the recess in the back-up shoe while it removes a portion of the welded material, thereby to restore the flange edge to its original curved geometry closely resembling the curved profile of the recess of said back-up shoe, d. the advance of the slide and blade being sufficiently large to bring the foremost edge of the flange of the blade into the recess of the back-up shoe and past the planar front surface thereof.

2. The method of refurbishing the elongate air seal flanges of worn turbine blades, which includes the steps of:

a. adding a bead of welding material to worn areas of the air seal flange of a blade so as to build up portions thereof which have been worn away, and thereafter in a machine having a work-performing station, a pair of power driven abrasive belts adjacent the station and a pair of pivotally-mounted pressure shoes at the station and engageable with the backs of the belts respectively such that the latter can be separately and independently laterally shifted by the shoes to advance their abrasive surfaces toward the work-performing station, and having a slide advanceable toward the work-performing station, the steps of:

b. clamping the blade onto said slide with its air seal flange facing said work-performing station and extending substantially parallel to those portions of the belts at said station, c. advancing said slide and blade toward the work performing station such that the air seal flange to be resurfaced is positioned adjacent to and substantially parallel to but not in contact with said belts, and d. independently advancing the pivotally mounted pressure shoes by limited amounts into engagement with the backs of said belts respectively to bring their abrasive surfaces into engagement with the opposite sides of the air seal flange so as to be able to remove controlled portions of the welded material from the opposite sides of the flange independently and thereby restore the sides to their original geometry.

\* \* \* \* \*